April 27, 1971 A. L. LIEPA 3,576,647
PREPARATION OF CHIP-TYPE PRODUCTS
Original Filed Oct. 31, 1967 6 Sheets-Sheet 1

INVENTOR.
Alexander L. Liepa
BY
ATTORNEYS

April 27, 1971     A. L. LIEPA     3,576,647

PREPARATION OF CHIP-TYPE PRODUCTS

Original Filed Oct. 31, 1967     6 Sheets-Sheet 3

INVENTOR.
Alexander L. Liepa

BY
ATTORNEYS

April 27, 1971 A. L. LIEPA 3,576,647
PREPARATION OF CHIP-TYPE PRODUCTS
Original Filed Oct. 31, 1967 6 Sheets-Sheet 5

INVENTOR.
Alexander L. Liepa
BY Fredrick H. Braun
Alfred J. Mayer
ATTORNEYS

April 27, 1971          A. L. LIEPA          3,576,647

PREPARATION OF CHIP-TYPE PRODUCTS

Original Filed Oct. 31, 1967          6 Sheets-Sheet 6

INVENTOR.
Alexander L. Liepa
BY Fredrick H. Braun
Alfred J. Mangue
ATTORNEYS

United States Patent Office 3,576,647
Patented Apr. 27, 1971

3,576,647
PREPARATION OF CHIP-TYPE PRODUCTS
Alexander L. Liepa, Cincinnati, Ohio, assignor to The Procter & Gamble Company, Cincinnati, Ohio
Continuation of application Ser. No. 683,083, Oct. 31, 1967, which is a continuation-in-part of application Ser. No. 569,278, Aug. 1, 1966. This application Oct. 7, 1969, Ser. No. 865,339
Int. Cl. A23l 1/12
U.S. Cl. 99—100
9 Claims

ABSTRACT OF THE DISCLOSURE

Method and apparatus for continuously preparing fried products from a sheet of edible dough including an infeed conveyor to carry the sheet of dough; a cutter for cutting pieces the desired size from the sheet; a shaper-molder utilizing movable, apertured mold halves to shape the cut pieces to the desired surface conformation and hold them during subsequent processing; and a reservoir containing a frying medium through which the shaped, restrained pieces are passed until they are fried to a crisp state. The fried objects assume a final shape defined by the shaper-molder.

CROSS REFERENCE TO RELATED APPLICATION

This application is a continuation of application Ser. No. 683,083, filed Oct. 31, 1967, now abondoned, which was a continuation-in-part of applicant's co-pending application Ser. No. 569,278, filed Aug. 1, 1966, now abandoned. Each of said abandoned applications were entitled "Method of and Apparatus for Preparing Chip-Type Products."

BACKGROUND OF THE INVENTION

This invention relates to a food processing method and apparatus and more particularly to a method and apparatus for continuously cutting, shaping, and thereafter holding thin slices of edible dough, including means for conveying the same through a frying medium to form a crisp, chip-type snack food product such as potato chips.

The usual method of frying potato chip products involves the slicing of raw potatoes, the insertion of these slices into a reservoir of hot fat for a predetermined period so that the slices are fried to a crisp state, and then the removal of the fried chips from the fat. The chips so prepared have a random surface curvature which is influenced by the diameter and thickness of the potato slices and is dependent both upon the amount of time the slices are immersed in the hot fat and the temperature of the fat. The random shapes which the chips assume require that they be randomly packaged. Such a packaging arrangement results in a low bulk density of the product by reason of the large amount of air space within the package and increases the amount of packaging material required, thereby increasing the cost of the package. In addition, the slices are not positively conveyed through the fat, resulting in differences in color and texture of the resulting chips due to the differing times they are exposed to the hot fat. Both the ultimate chip shape and the frying time for each chip are difficult to control in the usual chip-producing apparatus and do not permit the production of chips having a relatively uniform color, texture, and shape.

SUMMARY OF THE INVENTION

Briefly stated, in accordance with one aspect of the present invention, a method and apparatus are provided for shaping thin pieces of edible dough to a predetermined surface conformation. A cutter is provided to cut uniformly-sized pieces from a sheet of dough and a pair of similarly configured apertured mold halves is adapted to receive the pieces from the cutter and to shape and hold the dough sections so that they conform with the shape of the mold. The mold halves are each provided with a multiplicity of apertures which are distributed over the surfaces thereof to permit the frying medium to pass therethrough and come into contact with the food product which is to be fried. The mold halves cooperate to hold the dough sections and restrain them during the frying thereof, so that the fried products conform in surface curvature with that of the mold surfaces.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in connection with the accompanying drawings in which:

DESCRIPTION OF THE PREFERRED EMBODIMENTS

Figure 1:
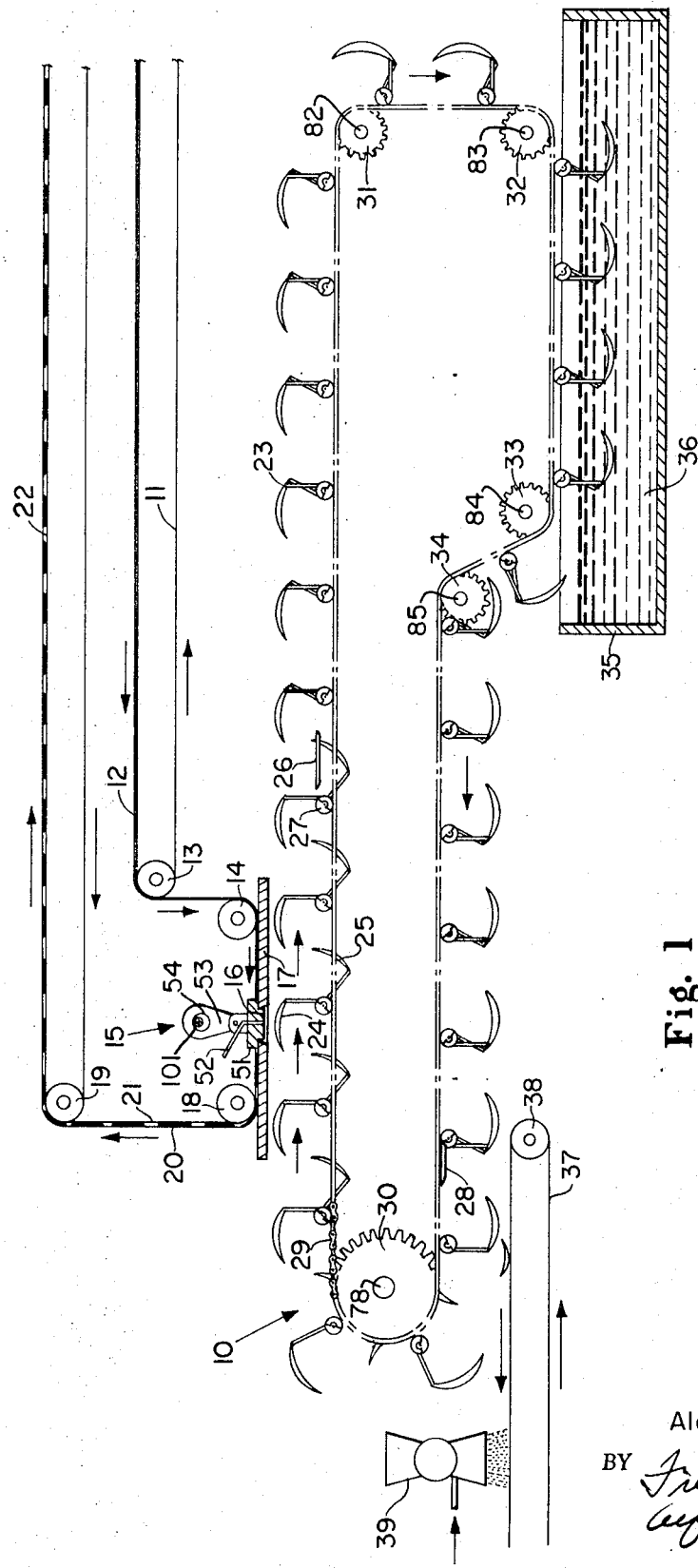
FIG. 1 is a diagrammatic side view of the chip-processing apparatus of the present invention, in partial cross section, showing the overall arrangement of the several parts thereof in operative relationship.

Referring now to the drawings, there is shown in diagrammatic form in FIG. 1 a chip-forming and shaping apparatus 10 to which is conveyed a sheet of edible dough 12 carried by endless conveyor belt 11. Conveyor belt 11 is preferably a solid belt to completely support the dough sheet and has a substantially flat surface to maintain the thin dough sheet in flat condition while it is being conveyed to the chip-cutting and shaping apparatus.

Belt 11 moves intermittently in the direction indicated by the arrows in FIG. 1 and receives a sheet of dough which is formed by passing mixed dough between a pair of spaced sheeting rolls (not shown) positioned upstream of belt 11. Belt 11 is supported by and travels around roll 13 to return to the sheet-forming rolls. Dough sheet 12 is carried by belt 11 and passes downwardly from the roll 13 to roll 14, which underlies roll 13, and then laterally from the roll 14 to a position immediately upstream of the cutting apparatus shown generally at 15.

Figure 2:
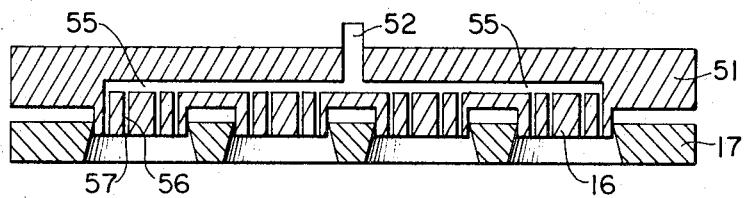
FIG. 2 is a cross-sectional elevation of the chip-cutting device of the apparatus.
Figure 3:
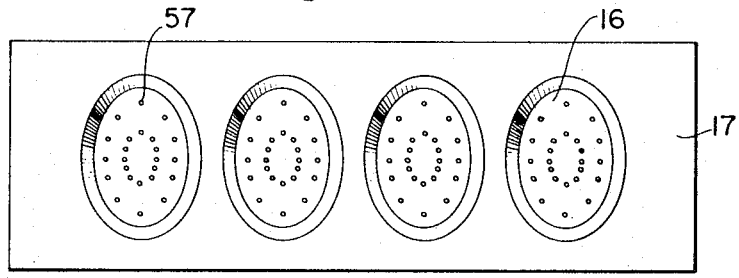
FIG. 3 is a bottom view of the chip-cutting device.

The cutting apparatus is shown in greater detail in FIGS. 2 and 3. As shown, a male cutting member 16 is suitably shaped and adapted to cut a dough section from dough sheet 12 in cooperation with a female cutting member 17. Cutting member 16 is adapted to be intermittently reciprocated with respect to member 17 so that as the dough sheet is moved to a position between the male and female members, dough sections are cut therefrom. Cutting member 16 comprises a support plate 51, a central air distributing tube 52, and lateral air distributing tubes 55. The air tubes can be used to convey either vacuum or pressure to the lowermost surfaces of cutting member 16 by means of air passageways 56 which are substantially uniformly distributed in a radial direction and communicate with lateral air distributing tubes 55, and which terminate in apertures 57 on the outer surface of cutting member 16.

When the dough is positioned between cutting member 16, in its upper position in the reciprocating cycle, and member 17, a vacuum can be applied to central air distributing tube 52. As the cutting member 16 in its downward stroke cuts individual dough sections from the main dough sheet, the vacuum created on the surface of the male mold members at the apertures 57 causes the individual cut pieces to stick thereto. The cut dough pieces are released from the cutter surface by releasing the vacuum within the distributing tubes 52 and 55 and creating a pressure therein which causes jets of air to issue from apertures 57 to force the dough pieces downwardly and forcibly eject them from the cutter surface at a predetermined time as will be hereinafter explained. The vacuum and pressure can alternate according to a predetermined time cycle depending on the frequency of operation of cutting member 16 and serve to provide positive control over the cut dough sections to assure their retention on the cutting member 16 and their release therefrom at the proper time. Vacuum retention of the cut dough pieces is optional and the character of the dough can be such that it will stick to the cutting member 16 by itself and without vacuum assist. Although shown in FIGS. 2 and 3 as providing a cut section of elliptical shape, other shapes of cutting members can be used to provide dough sections having different shapes.

Figure 11:
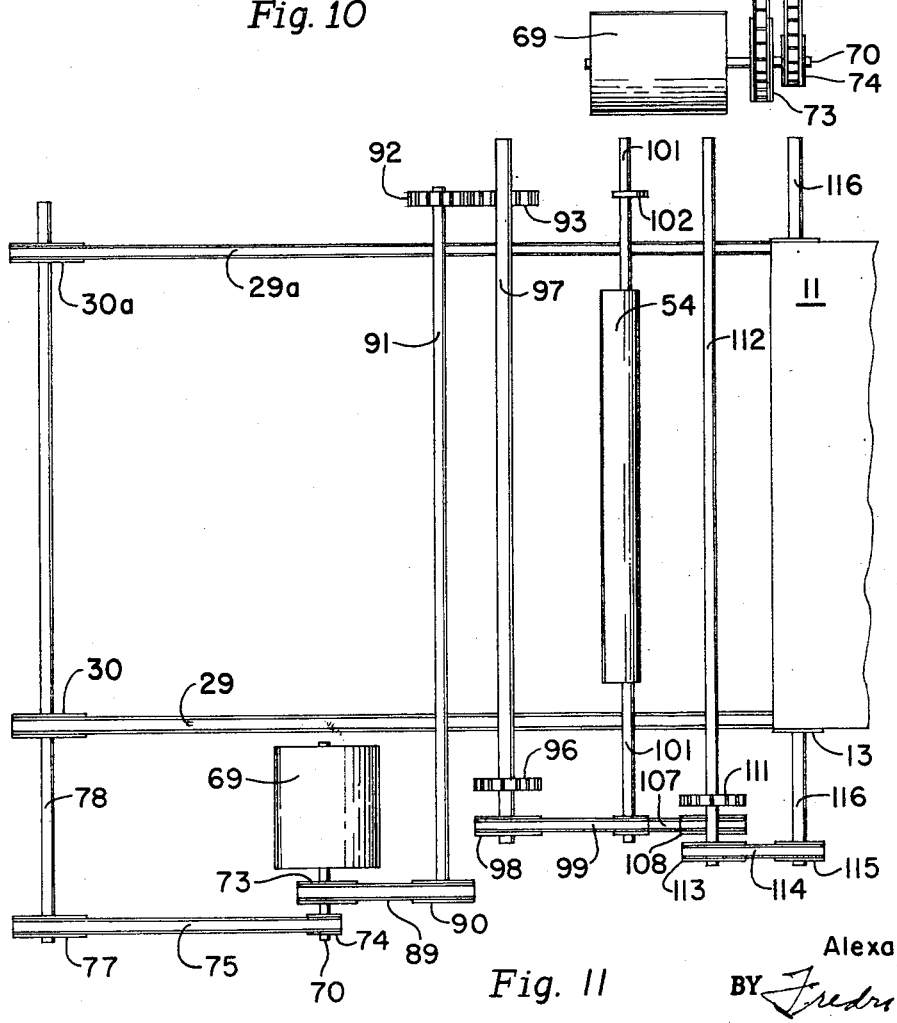
FIG. 11 is a fragmentary plan view taken along the line 11—11 of FIG. 8 showing the conveyor and cutter drive mechanism as seen from above.

The means by which cutting member 16 is reciprocated is shown in FIGS. 1 and 11 and comprises a shaft 101 having an eccentric 54 to drive a crank arm 53 which is movably pinned to cutting member 16. In operation, shaft 101 rotates intermittently in a manner and by means described more fully hereinafter, and by reason of the offset of eccentric 54 cutting member 16 is driven intermittently by the crank arm 53 in a reciprocating manner.

After the sections of dough are cut from dough sheet 12, the remaining portion of the sheet passes upwardly around roll 18 and is conveyed to endless, scrap return belt 22 which moves in synchronization with conveyor belt 11. After being so cut, the perforated dough sheet 20 has a series of spaced holes 21 therein, the lateral spacing being determined by the number and spacing of the individual cutting surfaces and the longitudinal spacing being determined by the speed of the dough sheet and the frequency of operation of the cutter 15. Belt 22 overlies the cutting apparatus 15 and passes around roll 19 to convey perforated dough sheet 20 to the spaced sheeting rolls (not shown) where the sheet is shredded and combined with freshly mixed dought.

In the operation of the dough feeding and cutting system above described, dough sheet 12 conveyed by endless belts 11 and 22 advances only when cutting member 16 is stationary and spaced from cutting member 17. When an uncut portion of dough sheet 12 is positioned between cutting members 16 and 17 sheet 12 stops. Shaft 101 carrying eccentric 54 is caused to rotate as hereinafter described, thereby driving cutting member 16 downwardly by means of crank arm 53 to cooperate with cutting member 17 to cut sections from dough sheet 12, which is stationary. Cutting member 16 is retracted from cutting member 17 to provide a space therebetween and then remains stationary in retracted position while dough sheet 12 advances to provide another uncut portion of dough between cutting members 16 and 17, whereupon the cycle above-described is repeated.

Figure 4:
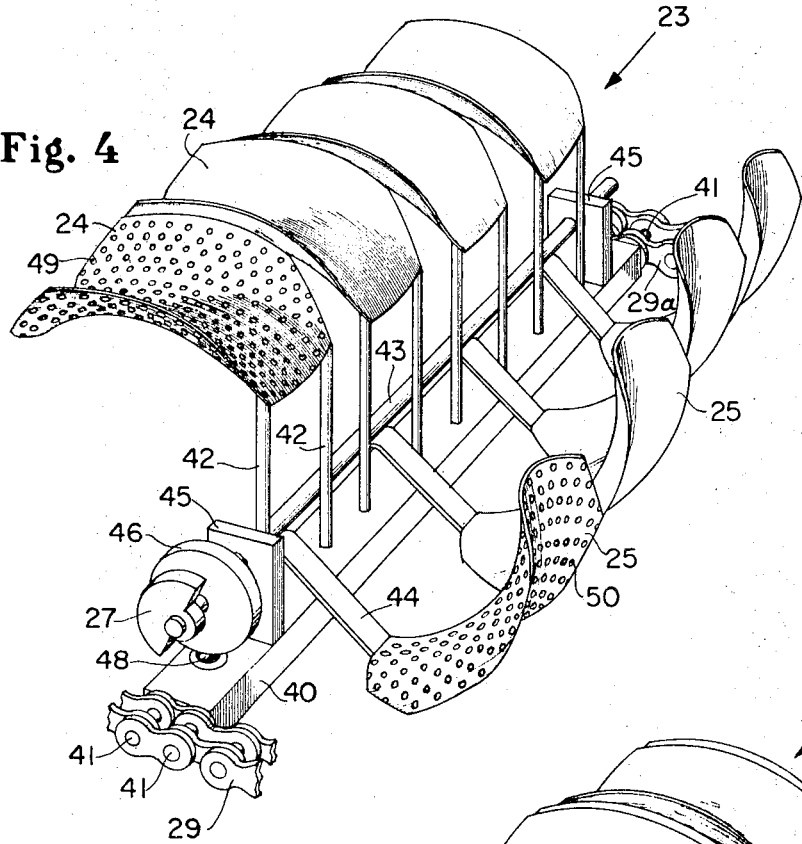
FIG. 4 is a perspective view of the product-shaping molds of the apparatus with the mold halves in the open position to which they are moved for both receiving and discharging the product.
Figure 5:
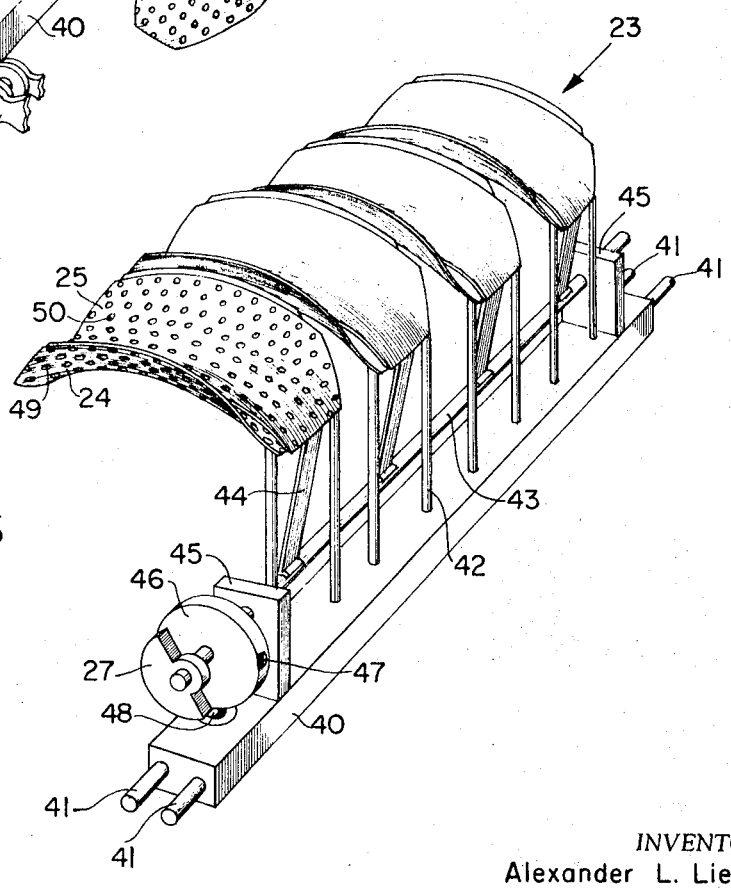
FIG. 5 is a perspective view of the product-shaping molds with the mold halves in the closed position.
Figure 10:
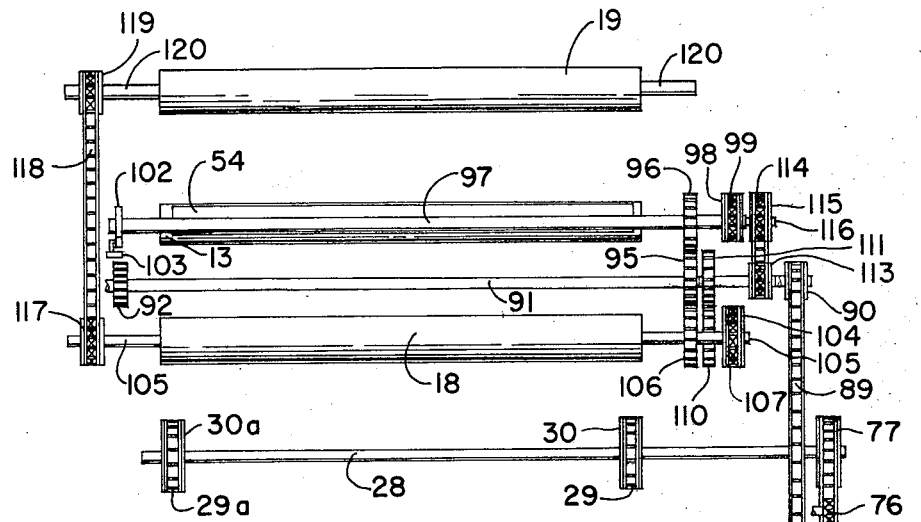
FIG. 10 is a fragmentary view along the line 10—10 of FIG. 8 showing an end elevational view of the conveyor and cutter drive mechanism.

As shown in FIGS. 1, 10, and 11, positioned under cutter 15 is a pair of spaced, parallel, conveyor chains 29 and 29a, only one of which is shown in FIG. 1. Conveyor chains 29 and 29a carry a series of mold assemblies 23 as shown in FIG. 1. The individual mold assemblies are shown in greater detail in FIGS. 4 and 5 and comprise a stationary mold half 24 and a movable mold half 25, each of which is similarly configured. The mold halves are adapted to receive, hold, and convey a dough section which is forcibly ejected from the cutter 15 by the jets of air which issue from apertures 57. The surfaces of mold halves 24 and 25 can be saddle-shaped as shown in FIGS. 4 and 5, in which the corresponding parts of stationary mold halves 24 and movable mold halves 25 are similarly curved in each of two orthogonal planes, or they can be fabricated in other shapes, as desired. Preferably, the mold halves are saddle-shaped to provide uniform chips which closely resemble commercially available chips made by frying unrestrained slices of raw potatoes and so that they can be packaged in a compact manner. A suitable package and method of packaging chips formed by means of the apparatus and method comprising the present invention is disclosed and claimed in U.S. Pat. 3,498,798 which issued on Mar. 3, 1970 from the co-pending application of Fredric J. Baur and Harold Kenneth Hawley, entitled "Packaging of Chip-Type Snack Food Products," said last-named patent is commonly owned by the assignee of the instant application.

The mold assemblies 23 are supported on a cross support 40 having a pair of pins 41 on both the proximal and distal ends thereof, which pins are adapted to be positioned within corresponding holes in the conveyor chains 29 and 29a as shown in FIG. 4, so that the latter may convey the cross support 40, and thus the mold assembly 34, along a predetermined path. Extending upwardly from the upper face of cross support 40 are supports 42 to which the stationary mold halves 24 are attached.

Positioned at each end of the upper face of cross support 40 is a journal 45 for supporting cross shaft 43 to which the movable mold halves 25 are attached by means of supports 44. Supports 42 and 44 serve to space the stationary and movable mold halves, respectively, from conveyor chains 29 and 29a to permit the dough selections enclosed therebetween to be passed through the frying medium without having the chains also pass therethrough. By rotating shaft 43, movable mold halves 25 are either brought into close, substantially uniformly spaced position adjacent to stationary mold halves 24 as shown in FIG. 5, or they can be spaced a relatively substantial distance from each other as shown in FIG. 4 to permit the dough sections to be deposited on the stationary mold half 24 or to permit the fried chips to be removed therefrom.

Shaft 43 carries a cam follower 27 at one end thereof to engage the stationary camming surfaces 26 and 28 shown in FIG. 1 in a manner to be hereinafter explained. Also attached to shaft 43 is an indexing wheel 46 having a pair of detent stops 47 thereon spaced from each other by about 110° of arc and which cooperate with a spring-loaded ball 48 to maintain shaft 43 in a predetermined position and thereby maintain the molds in either the closed position or in the open position. FIG. 5 shows one of the detent stops 47. This stop is adapted to hold movable mold halves 25 in the open position. The remaining detent stop is not visible in FIG. 5 because it is on the bottom of indexing wheel 46 in that view and is engaged with spring-loaded ball 48 to hold the mold halves 25 in the closed position with respect to stationary mold halves 24. When the mold halves are in the closed position, the opposed surfaces thereof are closely and substantially uniform spaced throughout their areas and are preferably spaced from about 0.03 inch to about 0.08 inch when the apparatus of this invention is used to prepare potato chips.

Mold halves 24 and 25 are provided with a multiplicity of apertures 49 and 50, respectively. These apertures are preferably uniformly distributed over the surfaces of the mold halves to permit the heated frying medium to come into intimate contact with the surfaces of the dough sections which are positioned therebetween and thereby fry the same to a uniform color and texture. Although it is preferred that the apertures be of uniform size and be distributed so that substantially all areas of the surfaces of the dough sections are contacted with the hot fat, non-uniformly-sized apertures can also be used. Additionally, while the apertures are shown only on the first pair of mold halves and are shown as being of circular form in FIGS. 4 and 5, all the mold halves have apertures and the apertures can be of any desired shape. The spacing of the apertures is limited only by the effect thereof on the rigidity of the mold surfaces, which must maintain their shape in order to provide chips of the desired, uniform surface conformation.

In terms of size, apertures having a diameter greater than about ⅜ inch are undesirable because the water dispersed within the dough can vaporize into steam during frying to form surface bubbles thereon as a result of which the dough can expand through the apertures and result in difficulty when the fried chip is to be removed from the molds. In an exemplary embodiment of the present invention, the mold sections 24 and 25 were fabricated from stainless steel sheet of about ⅟₃₂ inch in thickness having circular apertures 49 and 50 of about ⅟₁₆ inch diameter with the centers of the apertures spaced uniformly from one another by about ³⁄₁₆ inch in a staggered pattern.

Conveyor chains 29 and 29a carry a plurality of spaced mold asemblies 23 and are positioned so that the mold assemblies attached thereto pass directly beneath cutting apparatus 15. The chains move continuously and the speed thereof and the spacing of mold assemblies 23 is set so that the latter are synchronized with the intermittent reciprocating motion of cutter member 16 so that an open mold is positioned below the cutter to receive the dough sections which are periodically ejected from cutter 15 by discharging jets of air through apertures 57. The chains pass around a driving sprocket wheel 30 and idler sprocket wheels 31, 32, 33 and 34. While the drawings show four individual molds spaced transversely and extending from cross-support 40, any number of molds could be so arranged, depending upon the lateral spacing of conveyor chains 29 and 29a. Preferably, however, the number of molds forming a single mold assembly 23 equals the number of individual cutting dies in cutting apparatus 15.

After being ejected from cutter 15 the dough section falls by gravity onto stationary mold half 24. The movement of mold assembly 23 is properly timed such that its passage under the cutter results in central placement of the dough sections on stationary mold half 24. The mold assemblies are then conveyed by conveyor chains 29 and 29a past camming surface 26 (FIG. 1) which cooperates with cam follower 27 to rotate shfat 43 and thereby cause movable mold member 25 to come into cooperating relationship with stationary mold member 24 and constrain the cut dough section therebetween. A detent stop 47 on indexing wheel 46 cooperates with spring-loaded ball 48 to hold the movable mold member in the closed position.

Conveyor chains 29 and 29a then carry the mold assemblies 23 around idler sprockets 31 and 32 to a reservoir 35 having a suitable heated fat or frying medium 36 therein such as edible oil, shortening, or the like. Idler sprockets 32 and 33 are positioned in relation to the lengths of supports 42 and 44 so that only mold members 24 and 25 pass through the frying medium to thereby prevent contamination of the latter by lubricants, dirt, and like foreign matter which may cling to conveyor chains 29 and 29a. The time that the dough sections are immersed in the frying medium is determined both by the linear speed of conveyor chains 29 and 29a and the spacing between idler sprocket wheels 32 and 33.

When the dough sections are fried they become crisp chips which are carried from the frying medium by mold assemblies 23 and conveyed to and deposited on finished chip delivery belt 37, which passes continuously around idler roll 38 in the direction shown in FIG. 1 to carry the finished chips to a suitable packaging station. The chips are released from mold assemblies 23 by rotating the movable mold half 25 away from stationary mold half 24. This rotation is accomplished by carrying mold assemblies 23 past camming surface 28, which cooperates with cam follower 27 to cause rotation thereof and thereby rotate shaft 43 to which the movable mold halves 25 are affixed. After the movable mold half 25 is separated from the stationary mold half 24, the chips fall by gravity from mold assembly 23 onto the delivery belt 37 which carries the chips away from the forming and shaping apparatus 10 and under salter 39 which deposits salt uniformly over the surfaces thereof. Alternatively, the chips can be forcibly removed from stationary mold half 24 by means of an air jet.

Figure 6:
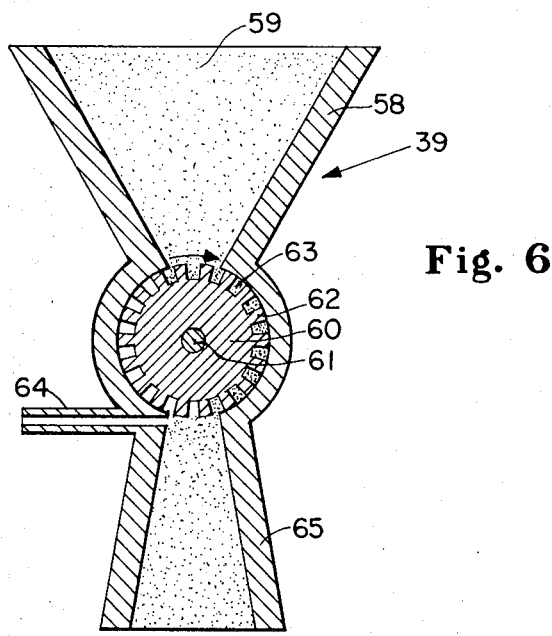
FIG. 6 is a cross-sectional elevation of the salt-dispensing device of the apparatus.

The salter is shown in detail in the cross-sectional view of FIG. 6 and comprises a salt reservoir 58 which holds a quantity of salt 59. Wheel 60 is keyed to shaft 61 and is disposed under reservoir 58. Wheel 60 has a plurality of alternate teeth 62 and spaces 63, the latter of which define salt-receiving pockets around the periphery of wheel 60 and which, when wheel 60 is rotated, carry the salt from the reservoir 58 to a discharge horn 65 disposed beneath wheel 60. Positioned tangentially to the periphery of wheel 60 is air tube 64 through which air passes and impinges on the periphery of wheel 60 to sweep the salt from the spaces 63 and fluidize it within the discharge horn 65 so that it is uniformly distributed therein and is thereby evenly distributed on the surfaces of the chips which pass thereunder. The amount of salt dispensed by salter 39 is dependent on the speed of rotation of wheel 60 and the volume of spaces 63.

Figure 7:
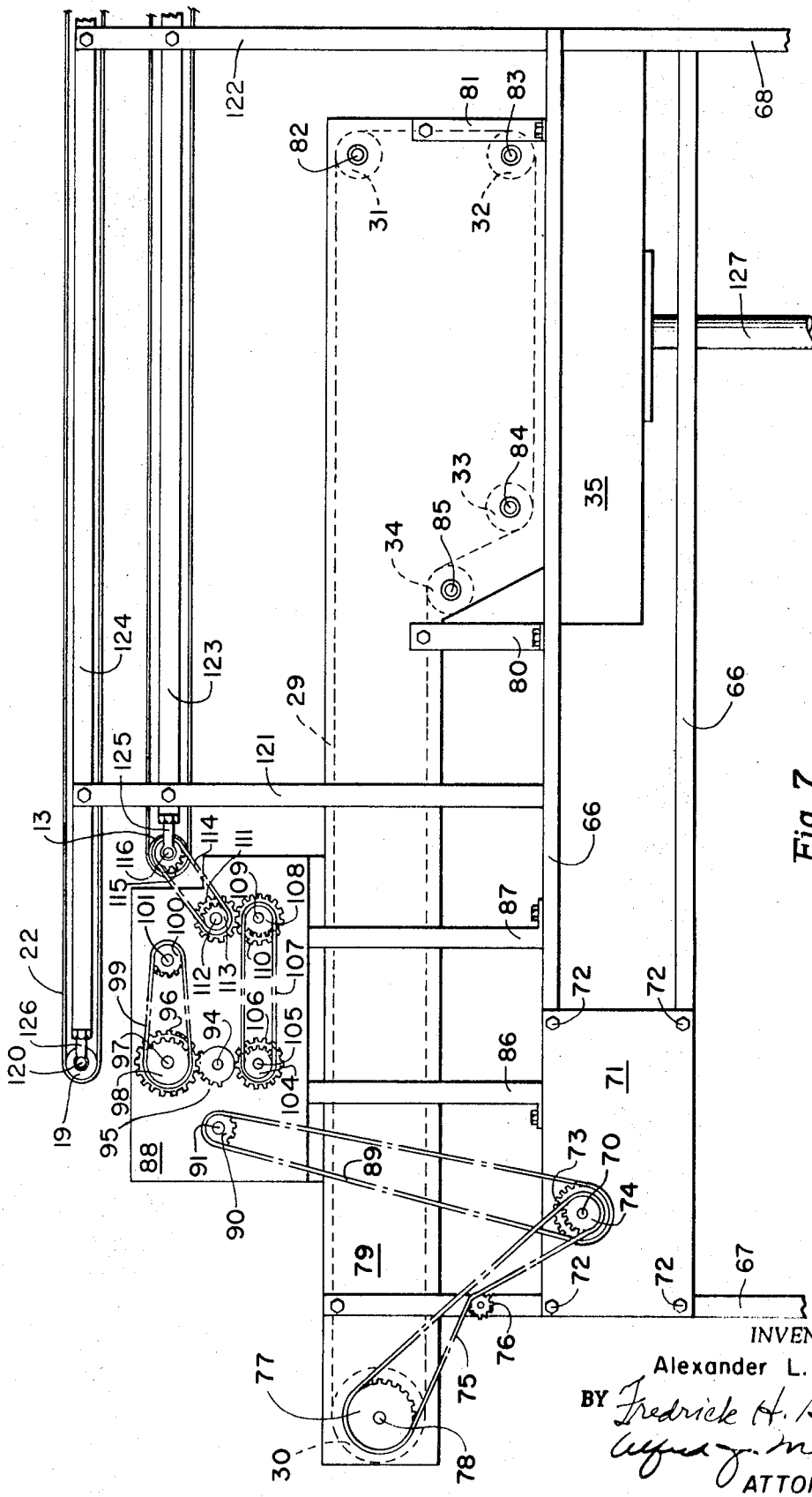
FIG. 7 is a side elevational view of the chip-processing apparatus of the present invention showing the several parts thereof in operative relationship.

The overall structure of the apparatus and the interrelationship of the various mechanical drive elements are shown in FIGS. 7 to 11. FIG. 7 shows the overall structural arrangement of the apparatus which is shown diagrammatically in FIG. 1. The structure is carried on frame 66 which defines the edges of a rectangular parallelepiped and is supported by legs 67 and 68.

Figure 8:
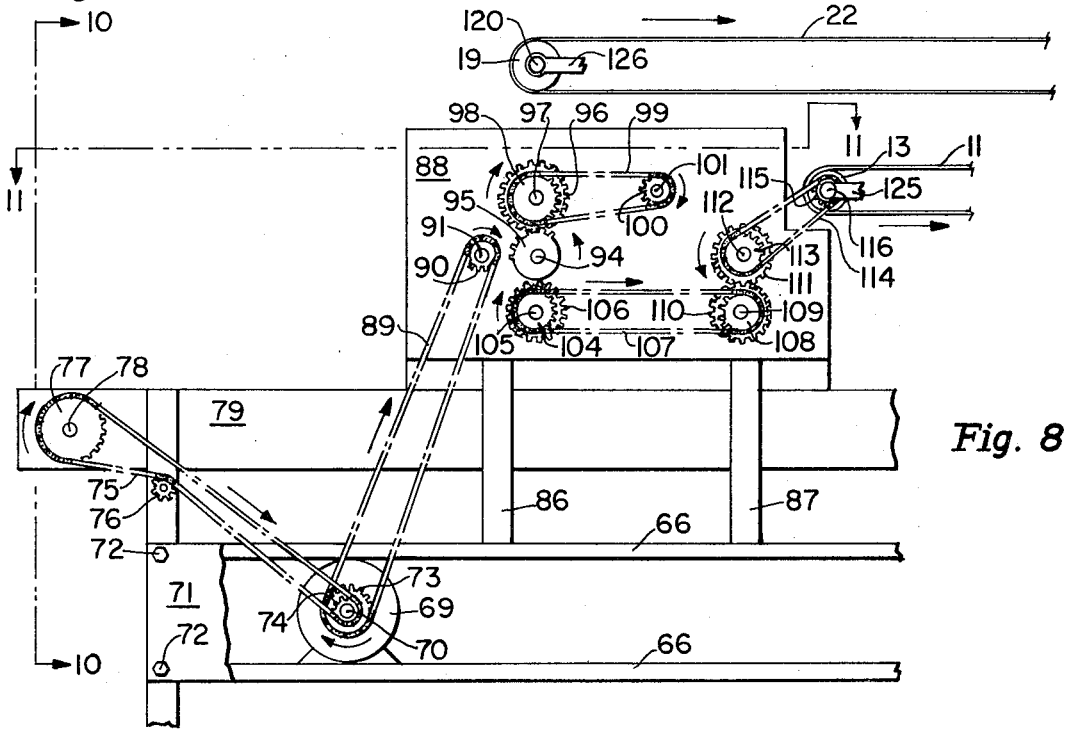
FIG. 8 is a fragmentary view of the conveyor and cutter drive mechanism as seen from the same side as in FIG. 7.

As is best seen on FIG. 8, the source of motive power is an electric motor 69 which is mounted on and supported by frame 66. The motive power is applied to shaft 70 which is journalled in plate 71 which, in turn, is affixed to frame 66 by means of bolts 72. Shaft 70 carries sprockets 73 and 74 which, respectively, transmit power to the cutter-feeder drive system and to the conveyor drive system through chains 89 and 75, respectively.

Conveyor chains 29 and 29a (shown in FIGS. 10 and 11) are driven by sprockets 30 and 30a, both of which are affixed to shaft 78. As seen in FIGS. 7 and 8, chain 75, which passes around sprocket 74 attached to shaft 70 and around idler sprocket 76, drives sprocket 77 which is affixed to shaft 78. Shaft 78 is journalled in frame 79, which is supported from frame 66 by the extension of leg 67 and by struts 80 and 81. Frame 79 also carries shafts 82, 83, 84, and 85 (FIGS. 1 and 7) on which sprockets 31, 32, 33, and 34, respectively, are mounted. These sprockets define the path of travel of the conveyor chains 29 and 29a.

Extending upwardly from frame 66 are support members 86 and 87 to which frame 88 is attached (FIGS. 7 and 8). Similarly, struts 86a and 87a on the opposite side of the apparatus support frame 88a as shown more clearly in FIG. 9.

Figure 9:
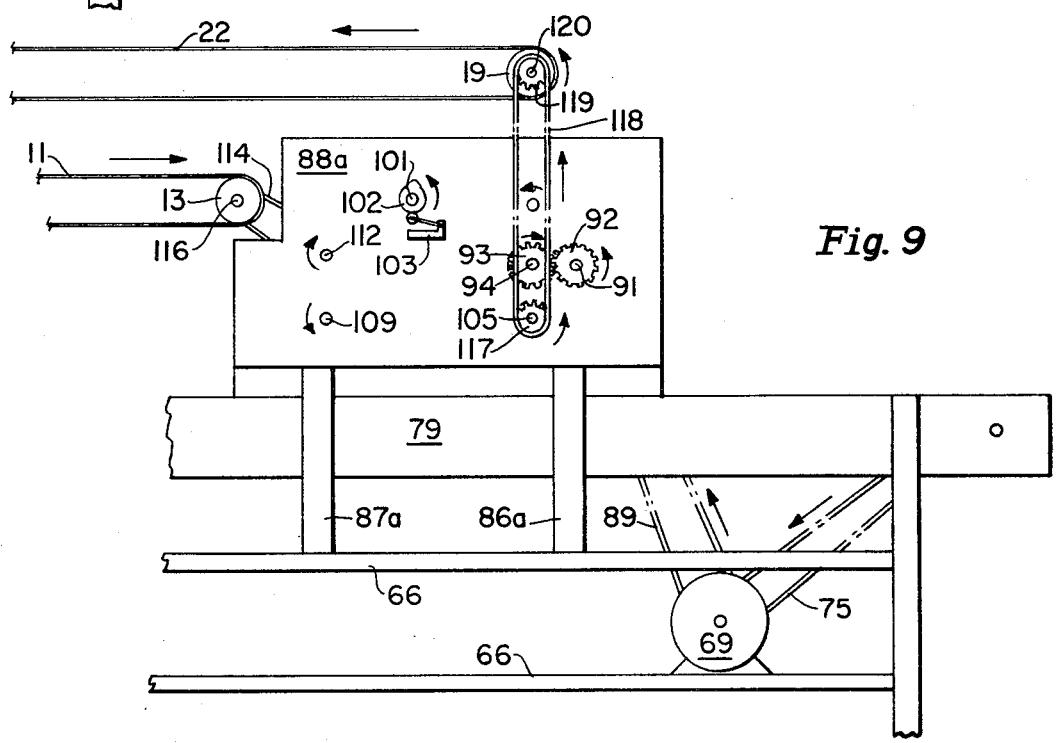
FIG. 9 is a fragmentary view of the conveyor and cutter drive mechanism as seen from the side of the machine opposite from that shown in FIG. 8.

Power is applied to the cutting and conveying section through chain 89 (see FIGS. 7 and 8) which passes about sprocket 73 attached to shaft 70. Chain 89 passes around and drives sprocket 90 attached to shaft 91, which is journalled at each end in frames 88 and 88a (FIGS. 8 and 9). As seen in FIG. 9, gear 92 is attached to shaft 91 at the end opposite that on which sprocket 90 is positioned. Gear 92 meshes with gear 93 to drive shaft 94. As shown in FIGS. 7 and 8, the end of shaft 94 opposite gear 93 carries sector gear 95 which intermittently engages and drives gears 96 and 106. Sector gear 95 transmits power to cutting mechanism 15 by intermittently driving gear 96 affixed to shaft 97, to which sprocket 98 is attached and which drives sprocket 100 by means of chain 99. Sprocket 100, in turn, is affixed to shaft 101 which carries eccentric 54 (FIGS. 1 and 10) to drive cutting member 16.

As seen in FIG. 9, shaft 101, on the end opposite the end which carries sprocket 100, carries and rotates cam 102, which is in continuous contact with a follower on switch 103. Switch 103 is a microswitch which energizes an electrically operated valve to momentarily open the valve and permit air to pass through air distributing tubes 52 and 55 shown in FIG. 2. This arrangement permits a controlled discharge of air to eject the cut section from the surfaces of the cutting member 16.

As seen in FIGS. 7, 8 and 10, sector gear 95 also intermittently drives gear 106 affixed to shaft 105, which carries and drives sprocket 104, also affixed to shaft 105. Chain 107 passes around sprockets 104 and 108, driving the latter which is affixed to shaft 109. Also attached to shaft 109 is gear 110 which mates with and drives gear 111 to rotate shaft 112 and thereby sprocket 113 attached thereto. As shown on FIGS. 7, 8, 10, and 11, chain 114 is driven by sprocket 113 and passes around and drives sprocket 115 which, in turn, rotates shaft 116. Shaft 116 carries roll 13 (FIGS. 1, 7, 8, 9, 10 and 11) about which feed belt 11 passes, and shafts 108 and 105, respectively, carry rolls 14 and 18 (FIG. 1), about which dough sheet 12 passes before and after passing through the cutter mechanism 15.

As best seen in FIGS. 7, 8, and 9, shafts 105, 109 and 112 are journalled in plates 88 and 88a.

By means of sector gear 95 and cooperating gears 96 and 106 (FIGS. 7, 8, and 10) the cutting mechanism 15 (FIG. 1) and the feed roll mechanism which drives rolls 13, 14, and 18 (FIG. 1) are driven alternately; that is, while the cutting mechanism is stationary, the rolls are moving and thus causing the dough sheet to move. Similarly, when the cutter mechanism is moving, the rolls and thereby the dough sheet, are stationary. The infeed belt 11 (FIGS. 1, 7, 8, 9, and 11) is driven by means of roll 13 through shaft 116.

Return belt 22 (FIGS. 1, 7, 8, and 9) is driven by roll 19 carried by shaft 120. As seen in FIG. 9, sprocket 119 is affixed to shaft 120 and is driven by means of chain 118. The latter is driven by sprocket 117 affixed to the end of shaft 105 opposite sprocket 106. Thus, when sector gear 95 drives gear 106 the latter passes only through about one-quarter of a revolution, thereby causing shaft 105 to pass through the same angular distance. By means of the chain arrangements shown in FIGS. 7, 8, and 9, both infeed belt 11 and return belt 22, in addition to rolls 14 and 18, are all moved simultaneously the same small distance. At this point the head of cutting mechanism 15 is in its uppermost position, thereby permitting dough sheet 12 to pass between male cutting member 16 and female cutting member 17 (FIGS. 1 and 2). After the sector gear separates from gear 106 shaft 105 (FIGS. 7 and 8) stops and the sector gear rotates to engage with and move gear 96 through a relatively small arc. By means of chain 99 the cutting head is driven through shaft 101. During the time this operation is taking place, belts 11 and 22 are stationary, as are rolls 14 and 18 (FIG. 1), and thus the dough sheet is stationary so that suitable pieces can be cut therefrom.

As seen in FIGS. 7 and 8, shafts 116 and 120, which, respectively, carry rolls 13 and 19, about which belts 11 and 22, respectively, pass, are supported by box beams 123 and 124, respectively, which carry uniball members 125 and 126. Box beams 123 and 124 are supported by upright members 121 and 122, which extend upwardly from frame 66.

The apparatus of the present invention is particularly suited for making potato chip products of the type disclosed in the co-pending application of Alexander L. Liepa, entitled "Potato Chip Products and Process for Making Same," Ser. No. 724,662, filed Mar. 18, 1968, said last-named application being commonly owned by the assignee of the instant application.

Although the invention is herein shown and described in terms of a reciprocating cutting apparatus, other cutting devices, such as, for example, a rotary cutter, can also be employed. Similarly, while the conveying means is shown as a single chain which carries both mold halves, a pair of chains, each of which carries one of the cooperating mold halves can be used. In the latter case, each of the chains can travel in a separate path for part of the cycle and then the pair can travel parallel paths during another part of the cycle in order to cooperatively engage the cut dough sections between the mold halves.

While particular embodiments of the invention have been illustrated and described, it will be obvious to those skilled in the art that various changes and modifications can be made without departing from the spirit and scope of this invention, and it is intended to cover in the appended claims all such changes and modifications that are within the scope of this invention.

What is claimed is:

1. A method of preparing crisp, chip-type snack food products having a predetermined, uniform shape, and made from an edible dough, said method comprising:
    (a) rolling a quantity of dough by passing said dough between a pair of closely spaced sheeting rolls to form a thin, flat dough sheet,
    (b) cutting dough sections of predetermined, uniform shape from said dough sheet by passing the sheet through a cutting apparatus comprising a pair of cooperating cutting members adapted to cut dough sections,
    (c) drawing a vacuum through a plurality of apertures in the surface of one of said cutting members to cause the contacting surface of the cut dough sections to be retained on said one of said cutting members,
    (d) forcibly removing said cut dough sections from the cutting member to which it is vacuum-held by relieving the vacuum and then blowing air against the contacting surface of the cut dough sections by means of a plurality of air jets which impinge directly on the contacting surface of the cut dough sections through the apertures in the surface of said one of said cutting members,
    (e) timing the removal of said cut dough sections from the cutting member and thereby depositing the sections upon one of a pair of curved, similarly configured, cooperating, apertured mold surfaces,
    (f) enclosing said cooperating mold surfaces about said cut dough sections and spacing said mold surfaces uniformly at a distance of from about 0.03 inch to about 0.08 inch throughout their areas to restrain and shape said cut dough sections in conforming relationship thereto,
    (g) passing said restrained sections through a reservoir of hot frying fat until they are crisp to form a plurality of uniformly shaped, chip-type food products,
(h) removing said restrained sections from said reservoir, and
(i) releasing said chips from said molds.

2. A method of preparing crisp chip-type snack food products having a predetermind, uniform shape, and made from an edible dough, said method comprising:
(a) rolling a quantity of dough by passing said dough between a pair of closely spaced sheeting rolls to form a thin, flat dough sheet,
(b) conveying said flat sheet on a substantially flat surface to maintain the thin dough sheet in flat condition during convying from the rolling step to the cutting step,
(c) cutting dough sections of predetermined, uniform shape from said dough sheet by passing the sheet through a cutting apparatus comprising a pair of cooperating cutting members adapted to cut dough sections,
(d) drawing a vacuum through a plurality of apertures in the surface of one of said cutting members to cause the contacting surface of the cut dough sections to be retained on said one of said cutting members,
(e) forcibly removing said cut dough sections from the cutting member to which it is vacuum-held by relieving the vacuum and then blowing air against the contacting surface of the cut dough sections by means of a plurality of air jets which impinge directly on the contacting surface of the cut dough sections through the apertures in the surface of said one of said cutting members,
(f) timing the removal of said cut dough sections from the cutting member and thereby depositing the sections upon one of a pair of curved, similarly configured, cooperating, apertured mold surfaces,
(g) enclosing said cooperating mold surfaces about said cut dough sections and spacing said mold surfaces uniformly at a distance of from about 0.03 inch to about 0.08 inch throughout their areas to restrain and shape said cut dough sections in conforming relationship thereto,
(h) passing said restrained sections through a reservoir of hot frying fate until they are crisp to form a plurality of uniformly shaped, chip-type food products,
(i) removing said restrained sections from said reservoir, and
(j) releasing said chips from said molds.

3. A method of preparing crisp, chip-type snack food products having a predetermined, uniform shape, and made from an edible dough, said method comprising:
(a) rolling a quantity of dough by passing said dough between a pair of closely spaced sheeting rolls to form a thin, flat dough sheet,
(b) cutting dough sections of predetermined, uniform shape from said dough sheet by passing the sheet through a cutting apparatus comprising a pair of cooperating cutting members adapted to cut dough sections,
(c) drawing a vacuum through a plurality of apertures in the surface of one of said cutting members to cause the contacting surface of the cut dough sections to be retained on said one of said cutting members,
(d) forcibly removing said cut dough sections from the cutting member to which it is vacuum-held by relieving the vacuum and then blowing air against the contacting surface of the cut dough sections by means of air jets which impinge directly on the contacting surface of the cut dough sections through the apertures in the surface of said one of said cutting members,
(e) timing the blowing of air against said contacting surface of each cut dough section and thereby depositing each of said cut dough sections by means of said air jets on the first of a pair of supporting mold surfaces, said first mold surface having a saddle-shaped surface formed by shaping same in each of two orthogonal planes,
(f) moving a second supporting mold surface of similar configuration to said first mold surface into superposition with said first supporting mold surface and spacing said mold surfaces uniformly at a distance of from about 0.03 inch to about 0.08 inch throughout their areas such that said cut dough sections are interposed therebetween for restraining, shaping and carrying said cut dough sections between said first and said second supporting mold surfaces,
(g) passing said cut dough sections while restrained by said pair of supporting mold surfaces through a reservoir of hot frying fat until they are crisp to form a plurality of uniformly shaped, chip-type food products,
(h) removing said restrained sections from said reservoir, and
(i) releasing said chips from said molds.

4. A method of preparing crisp, type snack food products having a predetermined, uniform shape, and made from an edible dough, said method comprising:
(a) rolling a quantity of dough by passing said dough between a pair of closely spaced sheeting rolls to form a thin, flat dough sheet,
(b) conveying said flat sheet on a substantially flat surface to maintain the thin dough sheet in flat condition during conveying from the rolling step to the cutting step,
(c) cutting dough sections of predetermined, uniform shape from said dough sheet by passing the sheet through a cutting apparatus comprising a pair of cooperating cutting members adapted to cut dough sections,
(d) drawing a vacuum through a plurality of apertures in the surface of one of said cutting members to cause the contacting surface of the cut dough sections to be retained on said one of said cutting members,
(e) forcibly removing said cut dough sections from the cutting member to which it is vacuum-held by relieving the vacuum and then blowing air against the contacting surface of the cut dough sections by means of a plurality of air jets which impinge directly on the contacting surface of the cut dough sections through the apertures in the surface of said one of said cutting members,
(f) timing the blowing of air against said contacting surface of each cut dough section and thereby depositing each of said cut dough sections by means of said air jets on the first of a pair of supporting mold surfaces, said first mold surface having a saddle-shaped surface formed by shaping same in each of two orthogonal planes,
(g) moving a second supporting mold surface of similar configuration to said first mold surface into superposition with said first supporting mold surface and spacing said mold surfaces uniformly at a distance of from about 0.03 inch to about 0.08 inch throughout their areas such that said cut dough sections are interposed therebetween for restraining, shaping and carrying said cut dough sections between said first and said second supporting mold surfaces,
(h) passing said cut dough sections while restrained by said pair of supporting mold surfaces through a reservoir of hot frying fat until they are crisp to form a plurality of uniformly shaped, crisp, chip-type food products,
(i) removing said restrained sections from said reservoir, and
(j) releasing said chips from said molds.

5. The method of claim 4 including the following additional steps:
   (a) conveying said fried, chip-type products to a salter, and
   (b) applying salt uniformly to at least one surface of said chips.

6. The method of claim 1 wherein the crisp, chip-type snack food products are potato chips.

7. The method of claim 2 wherein the crisp, chip-type snack food products are potato chips.

8. The method of claim 3 wherein the crisp, chip-type snack food products are potato chips.

9. The method of claim 4 wherein the crisp, chip-type snack food products are potato chips.

References Cited
UNITED STATES PATENTS

| | | |
|---|---|---|
| 2,286,644 | 1/1942 | Pringle et al. |
| 2,967,474 | 1/1961 | Ford. |
| 3,101,021 | 8/1963 | Johnson _____ 83—99 |
| 3,267,836 | 8/1966 | Yepis. |
| 3,297,450 | 1/1967 | Loska, Jr. _____ 99—100 |

LIONEL M. SHAPIRO, Primary Examiner

D. M. NAFF, Assistant Examiner

U.S. Cl. X.R.
83—99; 99—352